United States Patent [19]

Rosen

[11] 4,133,466
[45] Jan. 9, 1979

[54] TRAY AND RETAINER COMBINATION
[75] Inventor: Julius S. Rosen, Buffalo, N.Y.
[73] Assignee: American Optical Corporation, Southbridge, Mass.
[21] Appl. No.: 773,569
[22] Filed: Mar. 2, 1977
[51] Int. Cl.² .............................................. A47G 23/02
[52] U.S. Cl. ............................... 224/48 W; 24/221 R; 248/310; 248/500; 366/212
[58] Field of Search ........................... 224/48 R, 48 W; 248/313, 222.3, 407, 310, 500; 217/24; 220/19; 24/221 R, 73 R, 73 M, 212, 203; 403/353; 211/71, 74; 108/144, 149, 109; 366/209, 212, 215

[56] References Cited
U.S. PATENT DOCUMENTS

| | | | |
|---|---|---|---|
| 1,848,211 | 3/1932 | Townsend | 248/215 X |
| 2,059,006 | 10/1936 | Lang et al. | 217/24 |
| 2,171,110 | 8/1939 | Feicht | 211/74 |
| 2,545,714 | 3/1951 | Storer | 24/221 R |
| 2,964,199 | 12/1960 | Portner | 224/48 R X |
| 3,180,606 | 4/1965 | Sabin et al. | 248/222.3 X |
| 3,428,187 | 2/1969 | Baggott | 211/71 |
| 3,524,565 | 8/1970 | Wilson | 220/19 |

FOREIGN PATENT DOCUMENTS 156375  2/1939  Fed. Rep. of Germany ............. 217/24
7661 of  1913  United Kingdom ...................... 248/407

Primary Examiner—Albert J. Makay
Assistant Examiner—D. W. Underwood
Attorney, Agent, or Firm—Jeremiah J. Duggan; Alan H. Spencer

[57] ABSTRACT

A support tray for carrying and transmitting repetitious lateral motion to one or more containers has a plurality of parallel-spaced members extending transverse to the direction of motion and at least one retaining clip. The retaining clip can have upwardly-extending fingers for temporarily positioning a container and a twist lock for releasably engaging the spaced members to transmit lateral motion applied to the tray to the contents of the container and to position the container in a chosen location on the tray. A test tube rack can be fitted with a similar twist lock if it is desired to use one or more test tubes as the containers. The tray also has upwardly-extending handles which are used to transport the tray and support the same while repetitious motion is being transmitted to the container and its contents.

1 Claim, 6 Drawing Figures

TRAY AND RETAINER COMBINATION

BACKGROUND OF THE INVENTION

This invention relates to devices for transporting containers and transmitting motion to the contents thereof. More particularly, this invention relates to a tray having spaced-parallel members and clips engaging such members which position containers on the tray and transmit motion applied to the tray to the contents of such containers.

Devices used for transporting containers and for transmitting motion to the container contents are known. These devices have several uses but most commonly are utilized with water bath shakers. A typical water bath shaker has a rectangular tank for holding a fluid and means for maintaining a constant, usually elevated, fluid temperature. Water is the most common fluid used and tank size may vary from 2 to 30 gals. The water bath shaker has supporting means from which a tray can be suspended and which will impart a reciprocating motion to the tray and its contents. In operation, containers are positioned on the tray and partially immersed in the water bath. The bath is adjusted by heating and/or cooling means to a constant temperature and a drive mechanism actuated to agitate contents of the containers. Thus, the container contents are maintained at an even temperature, even for prolonged periods extending up to several days.

The tray arrangement for conventional water bath shakers usually comprises a frame adapted to receive a selected one of a series of special bottoms. Each bottom is specifically designed to position a number of a certain type of container, e.g. test tubes, beakers, Erlenmeyer flasks, etc. This arrangement is disadvantageous because only one type and size of vessel can be used with each bottom.

Some slightly more versatile trays have a pattern of holes in the bottom and separate clips which can be inserted into the holes. Because of weight and strength problems, such trays do not have many perforations and the number, type and arrangement of containers that can be supported at one time is not greatly increased.

It is an object of the present invention to overcome the disadvantages of the prior art.

BRIEF DESCRIPTION OF THE PRESENT INVENTION AND DRAWINGS

The present invention relates to a device having a bottom of a plurality of parallel-spaced bars with a combination handle and support means connected thereto for transporting the device or for supporting the device when positioned in a water bath shaker. Retaining means are releasably connectable to the bottom by a twist lock structure. The retaining means may have a configuration adapted to hold flasks, beakers or bottles. The retaining means may also be in the form of a rack for holding elongated containers, such as test tubes and the like.

DETAILED DESCRIPTION OF THE PRESENT INVENTION

Figure 1:
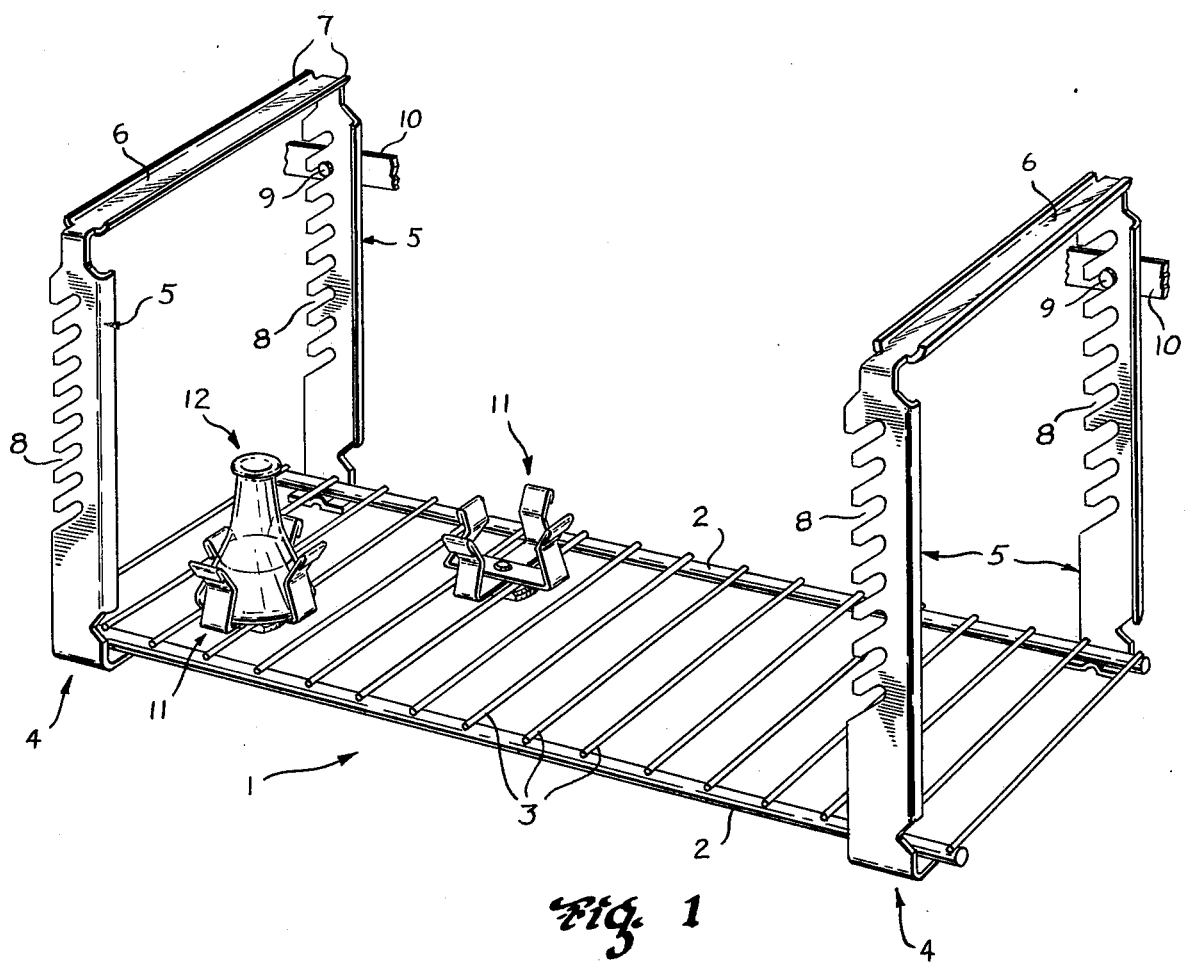
FIG. 1 is a top perspective view of the tray and retaining means.

Referring to FIG. 1, a tray 1 is shown generally having a pair of spaced-parallel bars 2 and evenly spaced transverse parallel bars 3 extending between bottom bars 2. Supports 4, generally indicated, are located at each end of parallel bars 2. Each support 4 has a pair of vertical members 5 extending up to a transverse handle 6. Handle 6 has upwardly-turned edges 7 to provide a comfortable grip when carrying a loaded tray 1. Each of vertical members 5 have upwardly-extending grooves 8 which are adapted to engage pins 9 extending inwardly from motion transmitting bars 10 (one shown broken away) of a water bath shaker (not shown). Retaining means 11 is shown with and without a container 12.

Figure 2:
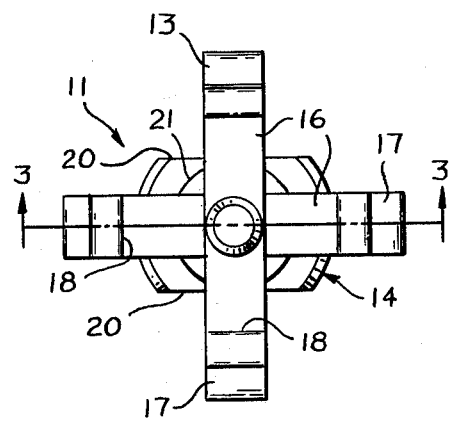
FIG. 2 is a top view of one embodiment of the retaining means.
Figure 3:
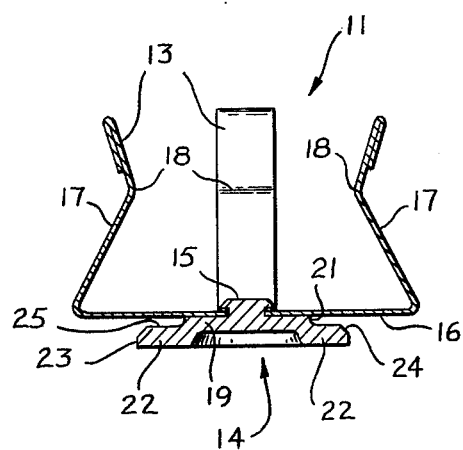
FIG. 3 is a front view (in section) of the retaining means shown in FIG. 2.
Figure 4:
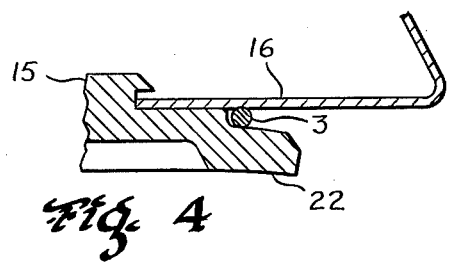
FIG. 4 is an enlarged view of a portion of the retaining means shown in FIG. 3 engaging the tray bottom.

FIGS. 2 and 3 show retaining means 11 in greater detail. Resilient clips 13 are fastened to lock 14 by rivet 15. Each clip 13 has a horizontally-extending portion 16 bisected by rivet 15. At opposite ends of the horizontally-extending portion 16, gripping portions 17 extend upwardly and inwardly and then are bent outwardly at location 18 to form a diverging zone to assist in placing container 12 in the clip. Containers having straight vertical sides are engaged by clips 13 at location 18 when their diameter is less than the length of horizontal portion 16. If the container has a diameter substantially the same as of horizontal portion 16 or inwardly-sloping sides, such as those of container 12, gripping portions 17 may also encase the container walls. Lock 14 has a center 19 acting as a backing for rivet 15 and is elongated in one direction. A pair of parallel sides 20 are spaced a distance apart slightly less than the spacing of bars 3, as is the periphery 21 of center 19. Lock ends 22 have a radial periphery 23 with a bevel 24 on the upper edge thereof. Top surfaces 25 of lock ends 22 engage transverse bars 3 as shown in FIG. 1. In operation, retaining means 11 is positioned with sides 20 of the lock means between bottom bars 3 and then retaining means 11 is twisted to force lock ends 22 below and horizontal portion 16 above adjacent bars 3. As shown in FIG. 4, lock 14 may be made of a material sufficiently flexible to distort without bending resilient clips 13.

Figure 5:
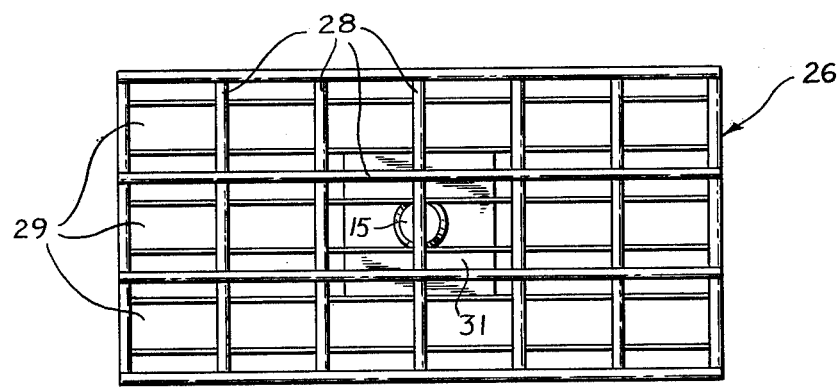
FIG. 5 is a top view of another embodiment of a retaining means.
Figure 6:
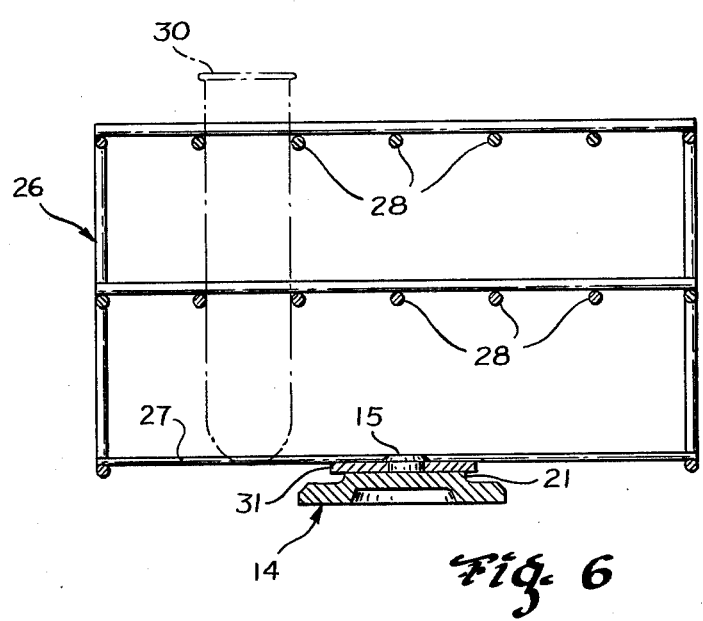
FIG. 6 is a side view of the embodiment of FIG. 5.

Referring to FIG. 5, a test tube rack 26 has bottom rods 27 and separators 28 to provide recesses 29 for holding test tubes 30. Lock 14 is fastened to center plate 31 which is attached to rods 27. The test tube rack is attached to the tray bottom in the same manner previously described for the embodiment of FIGS. 2 and 3.

What is claimed is:

1. A device for transferring a plurality of containers and transmitting repetitious horizontal motion from two reciprocating horizontally-extending carrier members to the containers which comprises in combination:

a bottom, said bottom having a plurality of spaced horizontally-extending parallel members fastened to at least two transverse connecting elements, support means, said support means including a pair of handles spaced above said bottom, at least one link connecting each said handle to said bottom, each said link being adapted to further supportably engage the respective horizontally-extending carrier member for said device to transmit motion from said carrier members to said bottom, and at least one retaining means, said retaining means having means for releasably engaging two of said parallel members, said means for releasably engaging two of said parallel members having an elongated base with a pair of longitudinal ends, said base having a maximum lateral dimension less than the spacing between two of said parallel members and a longitudinal dimension greater than the spacing between two of said parallel members, said longitudinal ends engaging two of said parallel members when said base is rotated to a first position and releasing two of said parallel members upon rotation of about 90° to a second position, said retaining means having gripping means for releasably holding said container at any location intermediate the ends of said parallel members and transmitting motion from said bottom to said container, said longitudinal ends being spaced from said gripping means and said spaced parallel members being held against said gripping means by said longitudinal ends.

* * * * *